United States Patent
Kroner

(10) Patent No.: US 9,660,796 B2
(45) Date of Patent: May 23, 2017

(54) METHOD FOR DETECTING IN A RECEIVER A TRANSMITTER LOCAL TIME

(71) Applicant: WEIDMÜLLER INTERFACE GMBH & CO. KG, Detmold (DE)

(72) Inventor: Michael Kroner, Oerlinghausen (DE)

(73) Assignee: Weidmueller Interface GmbH & CO. KG (DE)

( * ) Notice: Subject to any disclaimer, the term of this patent is extended or adjusted under 35 U.S.C. 154(b) by 0 days.

(21) Appl. No.: 14/890,695

(22) PCT Filed: May 27, 2014

(86) PCT No.: PCT/EP2014/060913
§ 371 (c)(1),
(2) Date: Nov. 12, 2015

(87) PCT Pub. No.: WO2014/191390
PCT Pub. Date: Dec. 4, 2014

(65) Prior Publication Data
US 2016/0119115 A1    Apr. 28, 2016

(30) Foreign Application Priority Data
May 29, 2013   (DE) .................. 10 2013 105 517

(51) Int. Cl.
*H04L 7/00*      (2006.01)
*G04G 7/00*      (2006.01)
(Continued)

(52) U.S. Cl.
CPC ............ *H04L 7/0079* (2013.01); *G04G 7/00* (2013.01); *H04J 3/0638* (2013.01); *H04L 12/40013* (2013.01); *H04J 3/0652* (2013.01)

(58) Field of Classification Search
CPC ....... H04L 7/0008; H04L 7/02; H04L 7/0331; H04L 7/0337; H04L 7/033;
(Continued)

(56) References Cited

U.S. PATENT DOCUMENTS 7,058,089 B2 * 6/2006 Franchuk .............. H04J 3/0638
370/503
2005/0237928 A1  10/2005 Le Scolan et al.
(Continued)

FOREIGN PATENT DOCUMENTS

DE    41 40 017 A1   6/1993
DE    4438806 C1     3/1995

*Primary Examiner* — Zewdu Kassa
(74) *Attorney, Agent, or Firm* — Laubscher, Spendlove & Laubscher, P.C.

(57) ABSTRACT

The method and apparatus for detecting in a receiver a transmitter local time, comprising determining a reference time for the transmitter local time; receiving from the transmitter a transmission time duration signal that elapsed on the transmitter since the reference time for the transmitter local time; and determining the transmitter local time based on the reference time for the transmitter local time and the received transmitter time duration. A time stamp signal based on the transmitter local time signal is generated at the receiver and is superimposed on the sensor data stream transmitted to the receiver. Consequently, the advantage is provided that a data stream can be transmitted without the incorporation of any time stamp.

9 Claims, 2 Drawing Sheets

(51) Int. Cl.
*H04J 3/06* (2006.01)
*H04L 12/40* (2006.01)

(58) Field of Classification Search
CPC ..... H04L 27/2647; H04L 1/20; H04L 1/0003;
H04L 1/0071; H04L 5/0007; H04L
1/0009; H04L 27/0008; H04N 5/4401;
H04B 1/30; H04B 1/28; H04B 1/40;
H04B 3/23
USPC ................................ 375/354, 316, 219, 295
See application file for complete search history.

(56) References Cited

U.S. PATENT DOCUMENTS

| | | |
|---|---|---|
| 2009/0016374 A1 | 1/2009 | Armstrong et al. |
| 2011/0122775 A1* | 5/2011 | Zampetti ............... H04J 3/0641 370/242 |
| 2012/0106356 A1 | 5/2012 | Johansson et al. |

* cited by examiner

METHOD FOR DETECTING IN A RECEIVER A TRANSMITTER LOCAL TIME

REFERENCE TO RELATED APPLICATIONS

This application is a national stage application under 35 C.F.R. §371 of the PCT International Application No. PCT/EP2014/060913 filed May 27, 2014, which claims priority of the German application No. DE 10 2013 105 517.6 filed May 29, 2013.

BACKGROUND OF THE INVENTION

Field of the Invention

The invention relates to a method for detecting a transmitter local time of a transmitter in a receiver, a method for producing a time stamp with the transmitter local time and a device and a computer program product for carrying out the method.

Description of Related Art

An electronic device constructed as a transmitter is known from Applicant's earlier German patent No. DE 44 38 806 C1 that can transmit data, for example to a master computer as receiver via a network constructed as a fieldbus. It is known that data transmitted from the transmitted can be provided with a time stamp in such a system, for example, in order to be able to evaluate the validity of the data in the receiver. For an error-free use of the time stamp clocks used in the transmitter and in the receiver should be running with the same time values so that a local time used in the producing of the time stamp by the transmitter is also correctly interpreted in the receiver at the time the data is transmitted. To this end the clocks in the transmitter and in the receiver are to be synchronized as regards their absolute time value, which, however, is associated with not insignificant technical expense.

This prior invention had the problem of transmitting of data from a transmitter to a receiver with regard to the use of time stamps. The present invention was developed to avoid this problem.

SUMMARY OF THE INVENTION

Accordingly, a primary object of the invention is to provide a method and apparatus for detecting in a receiver a transmitter local time, comprising determining a reference time for the transmitter local time; receiving from the transmitter a transmission time duration signal that elapsed on the transmitter since the reference time for the transmitter local time; and determining the transmitter local time based on the reference time for the transmitter local time and the received transmitter time duration. A time stamp signal based on the transmitter local time signal is generated at the receiver and is superimposed on the sensor data stream transmitted to the receiver. Consequently, the advantage is provided that a data stream can be transmitted without the incorporation of any time stamp.

According to an aspect of the invention a method for detecting a transmitter local time of a transmitter and receiver comprises the following steps: determining a reference time for the transmitter local time, receiving a transmitter time duration from the transmitter that has elapsed on the transmitter since the reference time for the transmitter local time and determining the transmitter local time based on the reference time for the transmitter local time and the received transmitter time duration.

In the method according to the invention no time stamp with an absolute time value is transmitted to the receiver by the transmitter but rather only a relative time that has elapsed since a reference time. If the reference time is known to the receiver to which the relative reference time duration received from the transmitter refers, it can compose the required time stamp itself on site. In this manner the transmitter does not need to keep its own clock with an exact absolute time. It is sufficient to use any timer with which time intervals can be measured at previously determinable reference times and which can be transmitted to the receiver.

This places the expense for keeping an exact time value only on the receiver but no longer on the transmitter. This can offer great advantages, in particular if the initially cited electronic device is, for example, a sensor that exclusively transmits the measured data in a control system but does not receive it and therefore does not have to carry out any validity checks on data itself. In addition, if the exact time value is being kept falsely in the receiver, then all detected transmitter local times can still be subsequently corrected in the framework of the indicated method since a uniform reference time is used for all detected transmitter local times.

In a further development of the indicated method the received transmitter time duration has a value of a meter running on the transmitter since meters can be especially readily implemented economically and technically as timers.

In another further development of the indicated method the reference time for the transmitter local time is the time of an event that takes place equally on the transmitter and on the receiver. This event can be any event as long as a certain absolute time can be associated with this event which must be the same on both devices. Thus, for example, the initialization or the start of the network can be taken as the event.

Another or additional possibility would be in the case of a sensor taking certain measuring situations as the event and determining, based on them, the reference time for the transmitter local time.

The reference time for the transmitter local time could be determined anew in regular intervals in order to, for example, correct drifting or jitter in the transmitter time duration emitted by the transmitter.

In a preferred further development of the indicated method in order to determine the reference time for the transmitter local time a receiver time duration that elapsed on the receiver since the event is detected and subtracted from the receiver local time. In this manner the reference time for the transmitter local time can be determined in the receiver at any particular time without the reference time for the transmitter local time itself having to be filed in a memory.

In an especially preferred further development of the indicated method in order to determine the transmitter local time the reference time for the transmitter local time is added to the received transmitter time duration.

According to another aspect of the invention a method for generating a time stamp with the transmitter local time to a data unit generated by a transmitter comprises the following steps: sending the data unit together with a transmitter time duration that elapsed since a reference time for the transmitter local time from the transmitter to a receiver and generating a time stamp based on the transmitter local time at the time of the sending of the generated data unit detected with one of the previously indicated methods.

According to another aspect of the invention a device constructed especially as a calculating unit is set up to carry out one of the indicated methods.

In a further development of the invention the indicated device comprises a memory and a processor. One of the indicated methods is filed in the form of a computer program in the memory and the processor for carrying out the method is provided when the computer program is loaded from the memory into the processor. The invention also relates to a computer program with program coding means in order to carry out all steps of one of the indicated methods when the computer program is carried out on a computer or one of the indicated devices.

The invention also relates to a computer program product that contains a program code which, when it is carried out on a data processing device, carries out one of the indicated methods.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
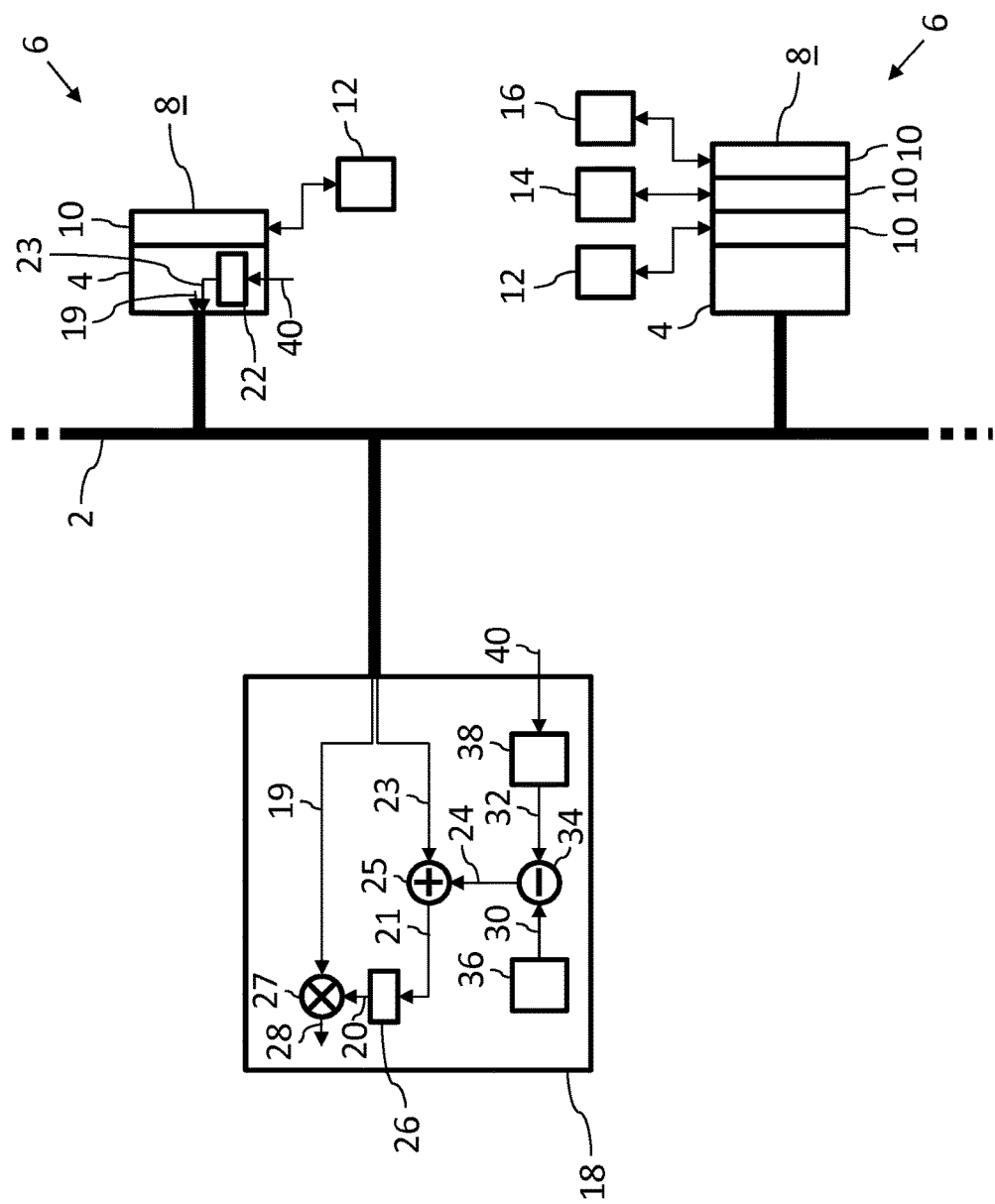
FIG. 1 is a block diagram of the network of the present invention for transmitting data from a plurality of electrical devices.

Reference is made to FIG. 1, which shows a basic view of a network 2 with an electronic device 6 comprising fieldbus connection module 4.

The network 2 can be, for example, a known fieldbus in the present embodiment which combines sensors and actuators to control systems in an industrial operation under a control level for setting command signals. Such fieldbuses such as, for example, CAN-open (controller area network), PROFIBUS, PROFINET and EtherCAT, are known and will not be described further in the following.

The individual electronic devices 6 can be constructed in the manner of a modular control system such as is known, for example, from the aforementioned German patent No. DE 44 38 806 C1. The individual electronic devices can comprise the particular connection module 4 in the framework of this construction. Connection blocks 8 can be connected to the network 2 via the individual fieldbus connection modules 4. The individual connection blocks 8 are built up from signal conductor disks 10 and supply disks (not shown) via which sensors 12, actuators 14 and other field devices 16 can be controlled.

Furthermore, a master computer 18 can be connected to the network 2 which has a higher order above the electronic devices 6 in order to control the electronic devices 6, for example in the framework of an automated manufacturing process and to set the previously mentioned command signals.

During the operation of the network, the fieldbus connection modules 4 of the electronic devices 6 serve as transmitters for transmitting data 19 such as error protocols or other information to the master computer 18. The master computer 18 receives the transmitted data 19 as a receiver and evaluates the received data 19. In this connection it can be necessary for the master computer 18 to derive the validity of the received data 19.

A possibility of making a measure for the validity of the data 19 available to the master computer 18 is to provide the data 19 with time stamps 20 from which, for example, the time of the creation or generation of the data 19 is unambiguously apparent. Such time stamps 20 could be generated, for example, based on a real time clock directly in the fieldbus connection modules 4 of the electronic devices 6 before the transmitting of the data 19, wherein, however, it must be ensured that an appropriate real time clock is also present on the master computer 18 as receiver that is synchronized with the real time clock of the corresponding electronic device 6 from which the master computer 18 receives the data. Only then can all participants 6, 18 in the network 2 start from the same time base for evaluating the validity of the data 19.

However, in the following the making a real time clock available in all network participants will be eliminated without having to do without the evaluation of the validity of the data 19. An example for this would be if one of the electrical devices 6 would have to transmit exclusively data 19. The master computer 18 could generate the time stamp 20 itself while the electronic device 6 itself does not require any time stamp. The generation of time stamp 20 for the data 19 transmitted from the electronic device 6 on the master computer 18 will be described in detail in the following.

In order to generate the time stamp 20 itself, the master computer 18 requires the local time 21 of the fieldbus connection module 4 of the electronic device 6 transmitting the data 19, which is called the transmitter local time 21 in the following. To this end a relative transmission time generator 22 such as, for example, a counter, is used in the present embodiment in the fieldbus connection module 4 of the electronic device 6 transmitting the data 19. This generator emits an elapsed time duration 23, called the transmitter time duration 23 in the following starting from a time reference basis still to be described which transmitter time duration is transmitted to the master computer 18.

If the fieldbus connection module 4 of the electronic device 6 transmitting the data 19 transmits data 19 to the master computer 18, then it also sends together with this data 19 the actual transmitter time duration 23 of the transmission time generator 22. The master computer 18 adds the received transmitter time duration 23 and the reference time 24 still to be described in an adding component 25, obtaining in this manner the above-named transmitter local time 21. The master computer 18 can then generate the time stamp 20 in a time stamp generation device 26 from the transmitter local time 21 and generate corresponding time-stamped data 28, for example in a mixer 27 based on the data 19 and the time stamp 20.

In order to carry out the previously described method the previously cited reference time 24 should be a time base to which the fieldbus connection module 4 of the electronic device 6 transmitting the data 19 as well as the master computer 18 jointly refer. In this instance the reference time 24 can be formed by subtraction from a real time 30 and a receiver time duration 32 in a subtraction component 34. The real time 30 is read out in the present embodiment from a real-time clock 36 running in the master computer 18. The receiver time duration 32 is a time duration value analogous to the transmitter time duration 23. It is therefore read out of a relative receiver time generator 38 which runs in the master computer 18 and which can be constructed as a counter as in the fieldbus connection module 4 of the electronic device 6 transmitting the data 19. Therefore, the above-named common time base and with it the reference time 24 can be found with the aid of the receiver time duration 32 to which the fieldbus connection module 4 of the electronic device 6 transmitting the data 19 as well as the master computer 18 refer in the generation of their corresponding time durations 23, 32.

In order to create such a common time base and with it a common reference time 24 the two relative time generators 22, 38 are synchronized according to event with one another by an event 40. Such a suitable event can be, for example, the cutting in of one of the two network participants 6, 18. Then, all relative time generators 22, 28 can be started with the reception of the event-synchronizing event 40.

Figure 2:
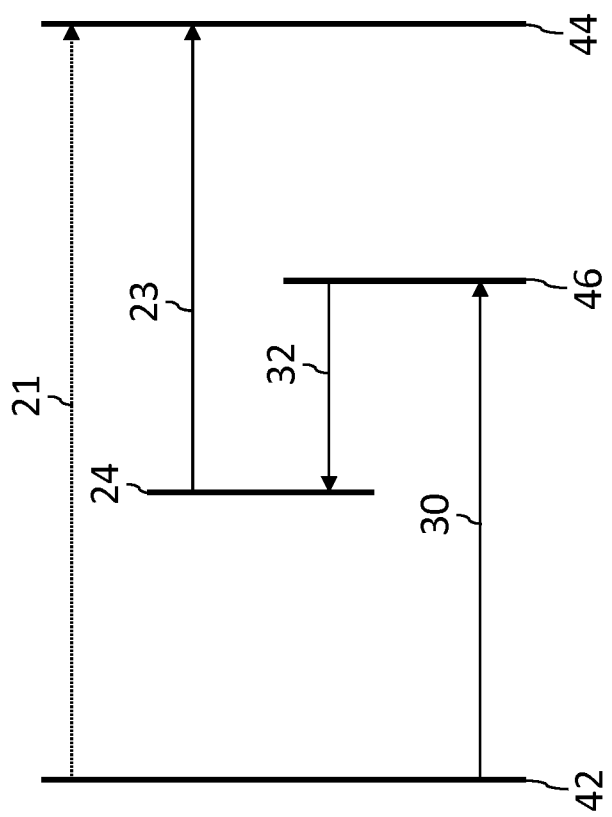
FIG. 2 is a diagrammatic representation of the method for determining at the receiver a transmitter local time at the time of sending the data.

The background of the event synchronization of the two time generators 22, 38 and the associated possibility of determining the transmitter local time 21 for generating a time stamp 20 in the master computer 18 will be illustrated in detail in the following using FIG. 2.

The transmitter local time 21 is also clearly a time duration that is, however, to be considered from a purely illustratively represented absolute reference time 42 that is comparable to a coordinate origin in a coordinate system. From this purely illustrative absolute reference time 42, the absolute transmitter local time 21 represents a time duration at any desired first time 44 in time and the absolute receiver local time 30 represents a time duration at any desired second time 46 in time. For the sake of clarity the absolute transmitter local time 21 is represented in FIG. 2 by a dotted line.

In contrast to the above, there is the common reference point in time 24 at which the event-synchronizing event 40 took place and at which both time generators 22, 38 were started. If the absolute receiver local time 30 is measured with it in the master computer 18 upon receipt of the data 19, is possible to calculate back at any time to the common reference time 24 at the time of the event 40 starting from this absolute receiver local time 30 via the receiver time duration 32 also available in the master computer 18. Starting from this common reference time 24, the master computer 18 can then unambiguously determine the transmitter local time 21 taking into consideration the received transmitter time duration 23 in the above-cited manner.

While in accordance with the provisions of the Patent Statutes the preferred forms and embodiments of the invention have been illustrated and described, it will be apparent to those skilled in the art that changes may be made without deviating from the invention described above.

What is claimed is:

1. The method for detecting in a receiver the local time of a transmitter, comprising the steps of:
   (a) transmitting a data stream and a transmitter time duration signal from the transmitter in response to the occurrence of an event;
   (b) receiving the data stream and the transmitter time duration signal in the receiver;
   (c) generating a receiver time duration signal in response to said occurrence of an event;
   (d) generating a real time signal;
   (e) subtracting said receiver time duration signal from said real time signal, thereby to produce a common reference time; and
   (f) adding said common reference time to said transmitter time duration signal, thereby to produce the transmitter local time.

2. The method as defined in claim 1, wherein the received transmitter time duration signal is generated by a counter running at the transmitter.

3. The method as defined in claim 2, wherein said common reference time for the transmitter local time is initiated upon an event that takes place at both the transmitter and the receiver.

4. The method as defined in claim 3, and further comprising the step of:
   (g) updating the common reference time based on a second event.

5. The method as defined in claim 3, wherein the common reference time for the transmitter local time is determined by:
   (1) detecting a receiver time duration that elapsed on the receiver since the event, and
   (2) subtracting the receiver time duration from the current receiver local time.

6. The method as defined in claim 1, and further comprising the step of:
   (g) generating a time stamp on the received data based on the transmitter local time.

7. Apparatus for detecting in a receiver the transmitter local time of a transmitter, comprising:
   (a) a transmitter including a transmission time generator responsive to the occurrence of an event for transmitting a data stream and a transmitter time duration signal;
   (b) a receiver for receiving said data stream and said transmitter time duration signal, comprising:
      (1) a relative receiver time generator responsive to said occurrence of an event for generating a receiver time duration signal;
      (2) a real time clock for generating a real time signal;
      (3) a subtraction device operable to subtract said receiver time duration signal from said real time signal, thereby to produce a common reference time; and
      (4) an addition device for adding said common reference time to said transmitter time duration signal, thereby to produce a transmitter local time signal.

8. The apparatus defined in claim 7, and further including;
   (5) a time stamp generator for generating a time stamp signal based on said transmitter local time signal; and
   (6) an addition device for adding said time stamp signal to said data steam, thereby to produce a time-stamped transmitted data stream.

9. The apparatus defined in claim 8, wherein said transmitter includes:
   (a) at least one field device for producing a data stream as a function of a physical property being measured: and
   (b) a relative transmission time generator operable upon the occurrence of the event to produce said transmitter time duration signal.

* * * * *